(12) United States Patent
Park et al.

(10) Patent No.: US 8,194,303 B2
(45) Date of Patent: Jun. 5, 2012

(54) OPTICAL IMAGE MODULATOR, OPTICAL APPARATUS INCLUDING THE SAME, AND METHODS OF MANUFACTURING AND OPERATING THE OPTICAL IMAGE MODULATOR

(75) Inventors: Yong-hwa Park, Yongin-si (KR); Jae-hyung Jang, Seoul (KR); Yong-chul Cho, Suwon-si (KR); Chang-soo Park, Daejeon (KR); Byeong-ha Lee, Gwangju (KR)

(73) Assignees: Samsung Electronics Co., Ltd., Suwon-si (KR); Gwangju Institute of Science and Technology, Gwanghu (KR)

( * ) Notice: Subject to any disclaimer, the term of this patent is extended or adjusted under 35 U.S.C. 154(b) by 0 days.

(21) Appl. No.: 12/615,381

(22) Filed: Nov. 10, 2009

(65) Prior Publication Data

US 2010/0177372 A1    Jul. 15, 2010

(30) Foreign Application Priority Data

Jan. 15, 2009   (KR) .................. 10-2009-0003405

(51) Int. Cl.
*G02F 1/03* (2006.01)
*G02B 1/10* (2006.01)
(52) U.S. Cl. .................. 359/263; 359/244; 359/584
(58) Field of Classification Search .................. 359/237, 359/244–247, 248, 263, 250, 267, 344, 584
See application file for complete search history.

(56) References Cited

U.S. PATENT DOCUMENTS

| | | | |
|---|---|---|---|
| 5,206,872 A | 4/1993 | Jewell et al. | |
| 5,393,994 A * | 2/1995 | Kobayashi et al. | 257/84 |
| 5,451,767 A | 9/1995 | Amano et al. | |
| 5,577,064 A * | 11/1996 | Swirhun et al. | 372/96 |
| 6,331,911 B1 | 12/2001 | Manassen et al. | |
| 6,794,628 B2 | 9/2004 | Yahav et al. | |
| 6,990,135 B2 | 1/2006 | Johnson et al. | |
| 7,067,853 B1 | 6/2006 | Yao | |
| 7,079,307 B2 | 7/2006 | Chun Liu et al. | |
| 2004/0079954 A1 | 4/2004 | Taylor et al. | |
| 2005/0083567 A1* | 4/2005 | Liu et al. | 359/326 |
| 2009/0103583 A1* | 4/2009 | Tanaka et al. | 372/45.01 |

FOREIGN PATENT DOCUMENTS

JP    63-073585 A    4/1988

(Continued)

OTHER PUBLICATIONS

B. H. Na, 850nm GaAS/A1GaAs VCSEL with uniparabolic graded bragg mirror interface for low series resistance, GIST, Master Thesis, 2008.

(Continued)

*Primary Examiner* — Dawayne Pinkney
(74) *Attorney, Agent, or Firm* — Sughrue Mion, PLLC

(57) ABSTRACT

Disclosed are an optical image modulator, an optical apparatus including the same, and methods of manufacturing and operating the optical image modulator. The optical image modulator includes a light amount increasing unit increasing the amount of forward light emission of an electric-optical unit. The light amount increasing unit includes a first reflector reflecting light, which travels from the inside of the electric-optical unit toward the optical-electric unit, to the electric-optical unit. The light amount increasing unit may further include a second light reflector reflecting light, which passes through the optical-electric unit without optical-electric conversion, to the optical-electric unit.

30 Claims, 9 Drawing Sheets

FOREIGN PATENT DOCUMENTS

| | | |
|---|---|---|
| KR | 10-0170477 B1 | 10/1998 |
| KR | 10-2000-0064552 A | 11/2000 |
| KR | 10-0550417 B1 | 2/2006 |
| KR | 10-0795994 B1 | 1/2008 |

OTHER PUBLICATIONS

E. Schubert et al, "Elimination of heterojunction band discontinuities by modulation doping", Appl. Phys. Lett. vol. 60 pp. 466-468, Jan. 27, 1992.

O. Qasaimeh et al, "Monolithically Integrated Low-Power Phototransceiver Incorporating Microcavity LEDs and Multiquantum-Well Phototransistors", IEEE Photonics Technology Letters, vol. 12, No. 12, Dec. 2000.

W. Zhou et al, Low-Power Phototransceiver Arrays with Vertically Integrated Resonant-Cavity LEDs and Heterostructure Phototransistors, IEEE Photonics Techology Letters, vol. 13, No. 11. Nov. 2011.

* cited by examiner

OPTICAL IMAGE MODULATOR, OPTICAL APPARATUS INCLUDING THE SAME, AND METHODS OF MANUFACTURING AND OPERATING THE OPTICAL IMAGE MODULATOR

CROSS-REFERENCE TO RELATED APPLICATIONS

This application claims the benefit of Korean Patent Application No. 10-2009-0003405, filed on Jan. 15, 2009, in the Korean Intellectual Property Office, the disclosure of which is incorporated herein in its entirety by reference.

BACKGROUND

1. Field

One or more exemplary embodiments of the present invention relate to an optical image modulator, an optical apparatus including the same, and methods of manufacturing and operating the optical image modulator.

2. Description of the Related Art

Optical image modulators are used in imaging systems such as a laser radar (LADAR) and an infrared (IR) camera. Optical image modulators receive optical information about an object, modulate the brightness of the optical information to vary wavelengths, and transmit the modulated optical information to an optical image sensor such as a charge-coupled device (CCD).

In particular, optical-electric-optical (OEO) image modulators refer to modulators that convert optical information into electrical information, modulate the electrical information, and convert the modulated electrical information into optical information. OEO image modulators may amplify optical information, modulate the optical information at high speed, and vary wavelengths. Accordingly, such OEO image modulators are used as a key component in a three-dimensional (3D) camera, a LADAR, and an IR imager.

OEO image modulators receive an optical image in near infrared (NIR)—IR wavelengths of about 800 nm to about 1700 nm, generate current due to photoelectric effect, amplify or modulate the current by applying a modulating signal so that the current has a desired waveform, such as a sine waveform, a ramp waveform, or a square waveform, and then supply the amplified or modulated current to a light emitting device such as a light emitting diode (LED). The light emitting device supplied with the current emits visible light with wavelengths of about 450 nm to about 650 nm to which the sensitivity of an imaging device, such as a CCD, is high.

Since a light receiving device and a light emitting device in such an OEO image modulator are close to each other, the risk of optical interference between the light receiving device and the light emitting device is very high. For example, optical information generated by the light emitting device is imaged by the CCD. However, part of light scattered in the light emitting device is absorbed by the light receiving device. The light absorbed by the light receiving device is emitted through photo-electric conversion. The emitted light is unnecessary and becomes noise, thereby acting as a noise component to a normal image output from the OEO image modulator. The noise component may degrade the quality and reliability of the normal image, and degrade the modulation efficiency of the OEO image modulator as well.

SUMMARY

One or more exemplary embodiments of the present invention include an optical image modulator that may prevent optical interference between a light receiving device and a light emitting device and efficiently use incident light.

One or more exemplary embodiments of the present invention include an optical apparatus including the optical image modulator.

One or more exemplary embodiments of the present invention include a method of manufacturing the optical image modulator.

One or more exemplary embodiments of the present invention include a method of operating the optical image modulator.

According to one or more exemplary embodiments of the present invention, an optical image modulator includes: an optical-electric unit; an electric-optical unit; and a first light amount increasing unit increasing the amount of forward light emission of the electric-optical unit.

The first light amount increasing unit includes a first light reflector reflecting light, which travels from the inside of the electric-optical unit toward the optical electric unit, to the electric-optical unit. The first light reflector may be a distributed Bragg reflector (DBR) layer including a plurality of pairs each pair including a first layer with a first refractive index and a second layer with a second refractive index that is different from the first refractive index, wherein a varying area, which is situated near an interface between the first layer and the second layer to include a portion of the first layer and a portion of the second layer, may have a composition ratio that is varied.

The first light amount increasing unit may be included in the electric-optical unit as an element thereof. The first light amount increasing unit may be disposed between the optical-electric unit and the electric-optical unit.

The electric-optical unit may be a light emitting device.

The first light amount increasing unit may be a light reflector reflecting light, which travels from the inside of the electric-optical unit toward the optical-electric unit, to the electric-optical unit.

The optical image modulator may further include a second light amount increasing unit disposed between the optical-electric unit and the first light amount increasing unit increasing the amount of forward light emission of the electric-optical unit.

The optical-electric unit may be an optical-electric device. Alternatively, the optical-electric unit may include the optical-electric device and a modulation device modulating current generated by the optical-electric device.

The optical image modulator may further include an electron transporting layer disposed between the first light amount increasing unit and the second light amount increasing unit and transporting electrons generated by the optical-electric unit to the electric-optical unit, wherein the first light amount increasing unit is disposed under the electron transporting layer and the second light amount increasing unit is disposed over the electron transporting layer.

The second light amount increasing unit may be a second light reflector that reflects light, which passes through the optical-electric unit without optical-electric conversion, to the optical-electric unit. The second light reflector may be a DBR layer including a plurality of pairs each pair including a first layer with a first refractive index and a second layer with a second refractive index that is different from the first refractive index, wherein a varying area, which is situated near an interface between the first layer and the second layer to include a portion of the first layer and a portion of the second layer, may have a composition ratio that is varied continuously.

The composition ratio of the varying area may be varied in one manner selected from the group consisting of a parabolic manner, a stepped manner, and a linear manner.

The first light amount increasing unit and the second light amount increasing unit may contact each other to form a monolithic body.

According to one or more exemplary embodiments of the present invention, there is provided an optical apparatus having the optical image modulator. The optical apparatus may be a three-dimensional (3D) camera, a laser radar (LADAR), or an infrared (IR) imager, or a high-speed camera.

According to one or more exemplary embodiments of the present invention, there is provided a method of manufacturing an optical image modulator having an optical-electric device and an electric-optical device which are sequentially disposed, the method including forming a first light amount increasing unit between the electric-optical device and the optical-electric device, wherein the first light amount increasing unit increases the amount of forward light emission of the electric-optical device.

The first light amount increasing unit and the electric-optical device may constitute a monolithic electric-optical unit.

After the electric-optical device is formed, the first light amount increasing unit may be formed on the electric-optical device.

The method may further include forming a second light amount increasing unit between the first light amount increasing unit and the optical-electric device.

The first and second light amount increasing units are first and second DBR layers each including a varying area in which a composition ratio is varied continuously.

According to one or more exemplary embodiments of the present invention, there is provided a method of operating an optical image modulator including an optical-electric unit and an electric-optical unit which are sequentially disposed, and a first light amount increasing unit increasing the amount of forward light emission of the electric-optical unit, the method including: operating the optical-electric unit to generate current; and injecting or inputting the current generated by operating the optical-electric unit to the electric-optical unit through the first light amount increasing unit.

In the operation method, the optical image modulator may further include a second light amount increasing unit disposed between the optical-electric unit and the first light amount increasing unit, wherein the second light amount increasing unit reflects light, which passes through the optical-electric unit without optical-electric conversion, to the optical-electric unit and the current sequentially passes through the second light amount increasing unit and the first light amount increasing unit and is injected to the electric-optical unit.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
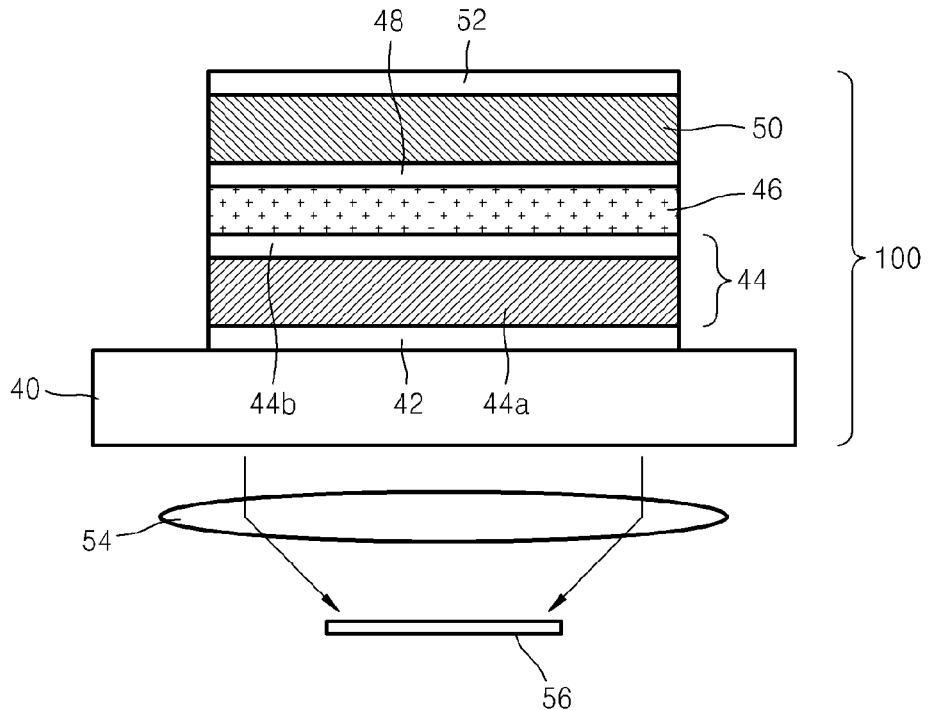
FIG. 1 is a cross-sectional view of an optical image modulator according to an exemplary embodiment of the present invention.

Reference will now be made in detail to the exemplary embodiments, examples of which are illustrated in the accompanying drawings. The thicknesses of layers or regions illustrated in the drawings are exaggerated for clarity.

FIG. 1 is a cross-sectional view of an optical image modulator 100 according to an embodiment of the present invention.

Referring to FIG. 1, the optical image modulator 100 may include a transparent substrate 40, a first transparent electrode layer 42, an electric-optical unit 44, an interface layer 46, an internal semiconductor electrode layer 48, an optical-electric device 50, and a second transparent electrode layer 52. Although the first transparent electrode layer 42, the electric-optical unit 44, the interface layer 46, the internal semiconductor electrode layer 48, the optical-electric device 50, and the second transparent electrode layer 52 are stacked sequentially on the transparent substrate 40 in FIG. 1, the elements may be stacked in the opposite order. That is, the optical-electric device 50, the internal semiconductor electrode layer 48, the interface layer 46, the electric-optical unit 44, the first transparent electrode layer 42, and the transparent substrate 40 may be stacked sequentially on the second transparent electrode layer 52, such that the transparent substrate 40 is an uppermost layer and the second transparent electrode layer 52 is a lowermost layer.

A relay lens set 54 is disposed in front of a light emitting surface of the optical image modulator 100. In FIG. 1, the light emitting surface may be a bottom surface of the transparent substrate 40. If the elements of the optical image modulator 100 are stacked in the opposite order as described above, the light emitting surface may be an outer surface of the second transparent electrode layer 52. An optical image sensor 56 is disposed next to the relay lens set 54. The relay lens set 54 focuses light on the optical image sensor 56. Accordingly, light passing through the relay lens set 54 is concentrated on the optical image sensor 56. For example, the optical image sensor 56 may be a charged coupled device (CCD) or a complementary metal oxide semiconductor (CMOS).

The transparent substrate 40 may be a glass substrate, or a transparent compound semiconductor layer such as a gallium arsenide (GaAs) layer. The first and second transparent electrode layers 42 and 52 may be transparent conductive oxide layers such as indium tin oxide (ITO) layers. The electric-optical unit 44 outputs light including optical information of light incident on the optical-electric device 50 by using current that is generated and modulated by the optical-electric device 50. At this time, light may be backward emitted from the inside of the electric-optical unit 44. That is, light may be emitted from the inside of the electric-optical unit 44 toward the optical-electric device 50. The electric-optical unit 44 may be a light emitting device, for example, a light emitting diode (LED), including a preventing member for preventing the light backward emitted from reaching the optical-electric device 50.

The preventing member may be a material layer having high conductivity and high reflectivity to a given central wavelength. For example, the central wavelength may be about 650 nm. The preventing member may be disposed outside the electric-optical unit 44. A central wavelength to which the preventing member disposed outside the electric-optical unit 44 has high reflectivity may be different from a central wavelength to which the preventing member included in the electric-optical unit 44 has high conductivity. For example, if the preventing member is disposed outside the electric-optical unit 44 and is used to reflect light, which passes through the optical-electric device 50 without optical-electric conversion, to the optical-electric device 50, a central wavelength to which the preventing member has high reflectivity may be about 850 nm.

Even though the position of the preventing member is the same, a central wavelength to which the preventing member has high reflectivity may vary according to a material used to form the preventing member. Since the amount of light emission of the electric-optical unit 44 toward the optical image sensor 56, that is, the amount of forward light emission may be increased due to the preventing member, the preventing member may be a light amount increasing unit.

The electric-optical unit 44 may include an electric-optical device 44a and a first distributed Bragg reflector (DBR) layer 44b. The electric-optical device 44a may be an LED or a light emitting device including phosphors. The electric-optical device 44a may include a p-type, n-type, or intrinsic III-V compound semiconductor. The electric-optical device 44a may be a structure including a fluorescent material and a light emitting device including any one of p-type, n-type, and intrinsic III-V compound semiconductors. The III-V compound semiconductor may be a compound semiconductor including aluminium (Al), gallium (Ga), indium (In), arsenic (As), antimony (Sb), phosphorus (P) or nitrogen (N).

The first DBR layer 44b includes a plurality of pairs each pair including a non-metal layer having a first refractive index and a non-metal layer having a second refractive index. One of the first refractive index and the second refractive index may be greater or less than the other. The first DBR layer 44b may be a first light reflector or a first light amount increasing unit which is an example of the preventing member. The first DBR layer 44b will be explained later.

The optical-electric device 50 may have a stacked structure including silicon (Si), germanium (Ge), and a p-type, n-type, or intrinsic III-V compound semiconductor. For example, the III-V compound semiconductor may be a compound semiconductor including Al, Ga, In, As, Sb, P or N. For example, the optical-electric device 50 may be a photodiode (PD), a phototransistor (PT), an avalanche photodiode (APD), or a quantum wall infrared photodetector (QWIP).

The interface layer 46 may be an electron transporting layer transferring current, which is generated and modulated by the optical-electric device 50, to the electric-optical unit 44. The interface layer 46 may be a compound semiconductor layer doped with conductive impurities, for example, a GaAs layer. Also, the interface layer 46 may be formed by combining Si, Ge, and a p-type, n-type, or intrinsic III-V compound semiconductor. The III-V compound semiconductor may be a compound semiconductor including at least one of Al, Ga, In, As, Sb, P, and N.

Figure 2:
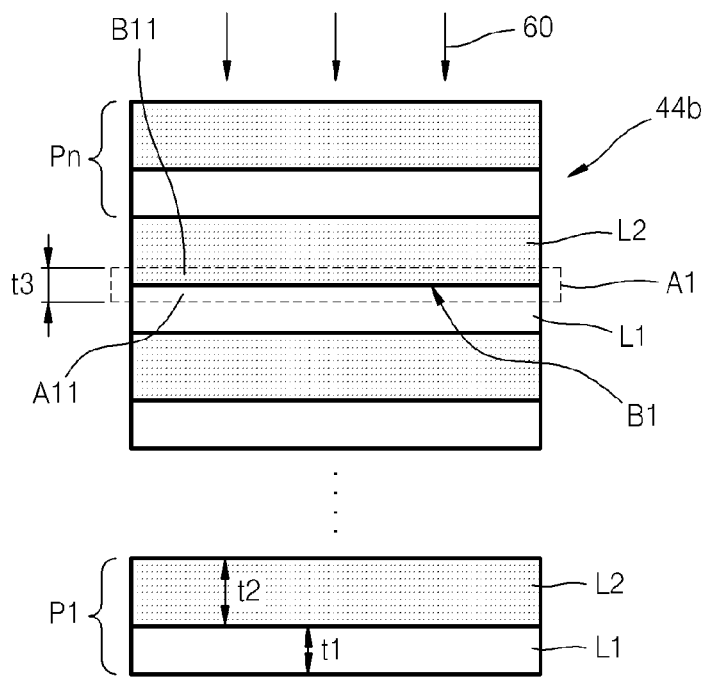
FIG. 2 is a cross-sectional view of a first distributed Bragg reflector (DBR) layer of the optical image modulator of FIG. 1.

FIG. 2 is a cross-sectional view of the first DBR layer 44b of the optical image modulator 100 of FIG. 1.

Referring to FIG. 2, the first DBR layer 44b includes a plurality of layers P1 through Pn which are stacked sequentially. The plurality of layers P1 through Pn may have the same composition. Each of the plurality of layers P1 through Pn may include first and second layers L1 and L2 having different refractive indexes. For example, each of the first and second layers L1 and L2 may be an $Al_xGa_{1-x}As$ layer ($0 \leq x \leq 1$). The first and second layers L1 and L2 may have the same composition, but may have different composition ratios. For example, the first layer L1 may be an $Al_{0.9}Ga_{0.1}As$ layer, and the second layer L2 may be an $Al_{0.3}Ga_{0.7}As$ layer. Although each of the first and second layers L1 and L2 is a material layer including three elements in FIG. 2, each of the first and second layers L1 and L2 may be a material layer including two elements, that is, the content x of Al may be 0 or 1 (x=0 or 1). Light incident on the first DBR layer 44b is sequentially reflected by the first and second layers L1 and L2 of the plurality of layers P1 through Pn, and then constructive interference occurs.

Accordingly, the thickness of each of the first and second layers L1 and L2 may vary according to a central wavelength to which the first DBR layer 44b has the highest reflectivity. In order to cause constructive interference between the lights reflected by the first and second layers L1 and L2, the thickness of each of the first and second layers L1 and L2 may be ¼ of the wavelength λ of the incident light in each of the first and second layers L1 and L2. Since the wavelength λ of the incident light in each of the first and second layers L1 and L2 is $1/n (=\lambda_0/n)$ of the wavelength $\lambda_0$ of the incident light, that is, $\lambda = \lambda_0/n$, the thickness of each of the first and second layers L1 and L2 may be $(\lambda_0)/(4n)$ where 'n' is the refractive index of each of the first and second layers L1 and L2.

Accordingly, for example, if a central wavelength of the first DBR layer 44b is the wavelength of light 60 incident from the electric-optical device 44a, the wavelength of the light 60 is about 650 nm, and the first and second layers L1 and L2 are respectively an $Al_{0.9}Ga_{0.1}As$ layer and an $Al_{0.3}Ga_{0.7}As$ layer, since the refractive indexes of the first and second layers L1 and L2 are respectively 3.8038 and 3.1892, the thickness t1 of the first layer L1 may be about 448 Å and the thickness t2 of the second layer L2 may be about 510 Å.

Due to the first DBR layer 44b, light emitted from the electric-optical device 44a to the optical-electric device 50 and to an adjacent pixel may be reflected to the electric-optical device 44a. A time difference between the light reflected by the first DBR layer 44*b* and the light directly emitted from the electric-optical device 44*a* to the transparent substrate 40 is much shorter than a time taken to modulate incident light that is 1 ns or so.

Accordingly, the light reflected by the first DBR layer 44*b* is not noise but may be used as light including information about light incident on the optical-electric device 50. The first DBR layer 44*b* improves the light utilization efficiency of the optical image modulator 100. As a result, the first DBR layer 44*b* may improve the quality and reliability of optical information output from the optical image modulator 100 by preventing light from being introduced from the electric-optical unit 44 to the optical-electric device 50.

The first and second layers L1 and L2 of the first DBR layer 44*b* may include a varying area A1 having a composition ratio that changes continuously. For example, the composition ratio of the varying area A1 including a first varying area A11 that is formed on the first layer L1 to a given thickness from an interface B1 and a second area B11 that is formed on the second layer L2 to a given thickness from the interface B1 may be different from the composition ratios of other areas of the first and second layers L1 and L2.

Figure 3:
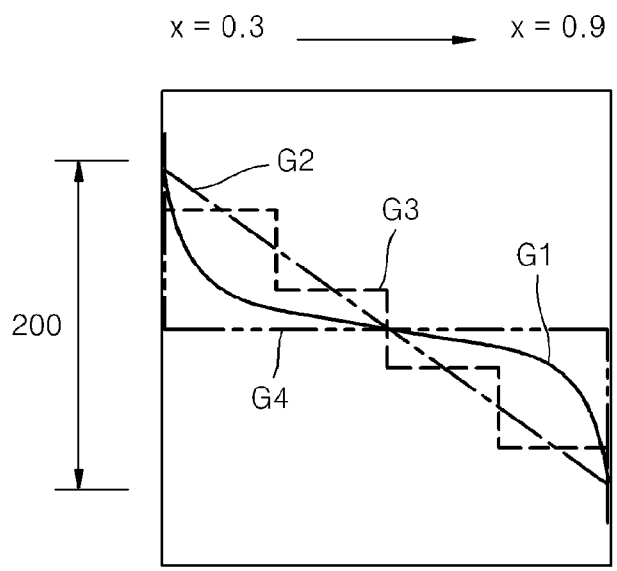
FIG. 3 is a graph for explaining composition ratio grading curves of a varying area of the first DBR layer of FIG. 2 where a composition ratio is varied.

In detail, the composition ratio of the varying area A1 may be between the composition ratio of the first layer L1 and the composition ratio of the second layer L2. For example, if the first layer L1 and the second layer L2 are respectively a $Al_{0.9}Ga_{0.1}As$ layer and a $Al_{0.3}Ga_{0.7}As$ layer, the composition ratio of Al in the first varying area A11 is gradually reduced toward the boundary of the second area B11 of the second layer L2, so that the composition ratio of Al in the boundary of the first varying area A11 is 0.9 and the composition ratio of Al in the boundary of the second area B11 is 0.3. The composition ratio of the varying area A1 may change in various ways. FIG. 3 is a graph for explaining composition ratio grading curves of the varying area A1 where a composition ratio changes.

Figure 7:
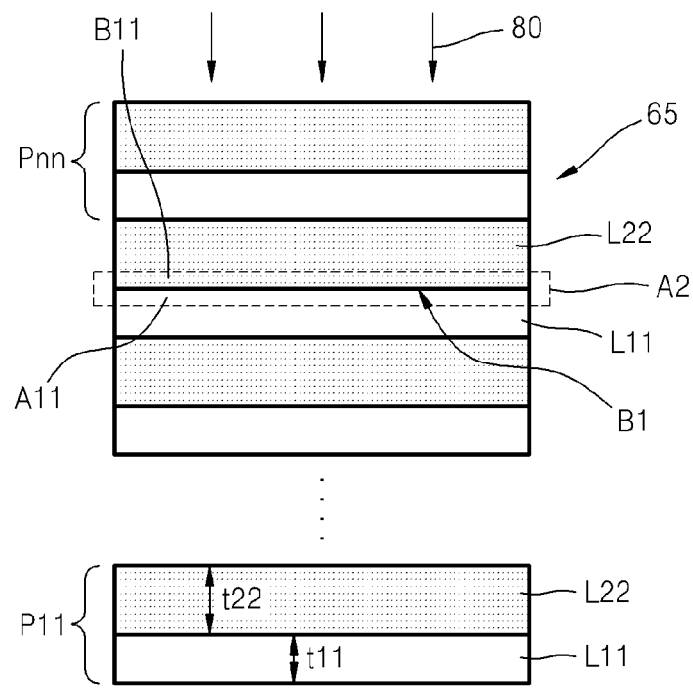
FIG. 7 is a cross-sectional view of a second DBR layer of the optical image modulator of FIG. 6.

Referring to FIG. 3, a first graph G1 illustrates a case where the composition ratio of the varying area A1 changes in a parabolic manner. A second graph G2 illustrates a case where the composition ratio of the varying area A1 changes in a linear manner. A third graph G3 illustrates a case where the composition ratio of the varying area A1 changes in a stepped manner. A fourth graph G4 illustrates a case where the composition changes abruptly near the interface B1 and the first varying area A11 and the second area B11 have their own selected compositions ratios. The thickness t3 of the varying area A1 of the first DBR layer 44*b* is 200 Å because the thickness the first varying area A11 is 100 Å and the thickness of the second area B11 is 100 Å in FIG. 3. In the second DBR layer 65, as shown in FIG. 7, the thickness may be different from the case of the first DBR layer 44*b*. The composition ratio of Al in the varying area A1 changes from 0.3 to 0.9. The variation in the composition ratio of the varying area A1 of the first DBR layer 44*b* may be represented by any one of the first graph G1 through the third graph G3.

Figure 4:
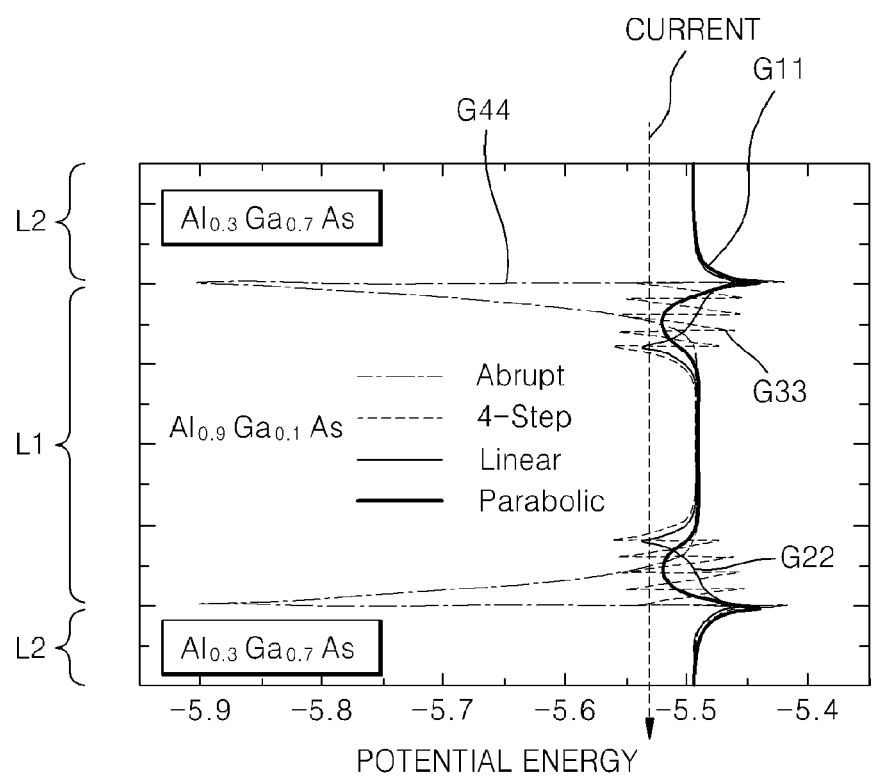
FIG. 4 is a graph showing potential energy between first and second layers of the first DBR layer of FIG. 2 when the varying area has the composition ratio grading curves of FIG. 3.

FIG. 4 is a graph showing potential energy eV between the first and second layers L1 and L2 of the first DBR layer 44*b* when the varying area A1 has the composition ratio grading curves of FIG. 3. Accordingly, first through fourth graphs G11, G22, G33, and G44 of FIG. 4 may correspond to the first through fourth graphs G1 through G4 of FIG. 3, respectively.

Referring to FIG. 4, comparing the first through fourth graphs G11 through G44, if the composition ratio of the varying area A1 of the first DBR layer 44*b* changes abruptly, potential energy between the first and second layers L1 and L2 changes sharply as shown in the fourth graph G44. If the composition ratio of the varying area A1 of the first DBR layer 44*b* changes in the parabolic manner, in the linear manner, or in the stepped manner, potential energy variation between the first and second layers L1 and L2 is much smaller than the case of the fourth graph G44 as shown in the first through third graphs G11 through G33.

Comparing only the first through third graphs G11 through G33, a change in potential energy between the first and second layers L1 and L2 is increased in the order of the first graph G11, the second graph G22, and the third graph G33. That is, a change in potential energy between the first and second layers L1 and L2 when the composition ratio of the varying area A1 of the first DBR layer 44*b* changes in the parabolic manner is the smallest.

Figure 5:
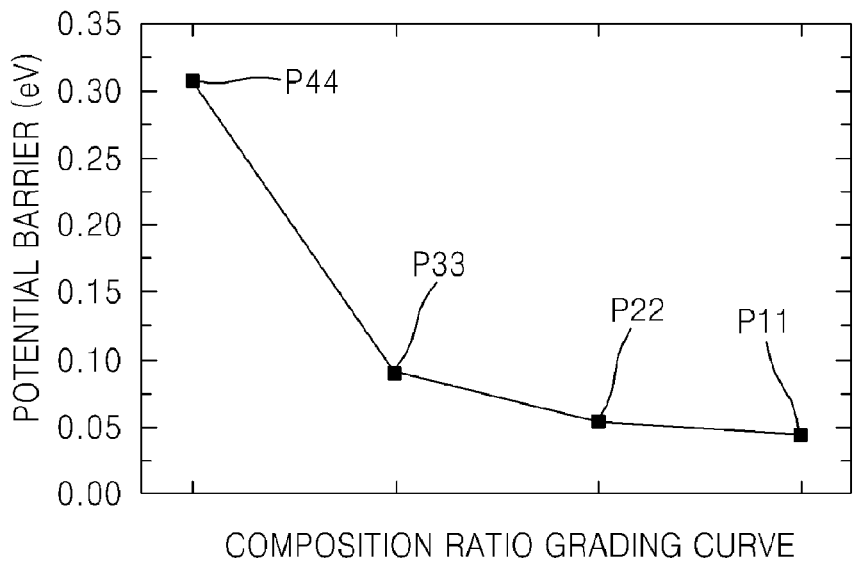
FIG. 5 is a graph showing potential barriers between the first and second layers of the first DBR layer of FIG. 2 when the varying area has the composition ratio grading curves of FIG. 3.

FIG. 5 is a graph showing potential barriers between the first and second layers L1 and L2 of the first DBR layer 44*b* of FIG. 2 when the varying area A1 has the composition ratio grading curves of FIG. 3. First through third points P11 through P33 represent potential barriers between valence bands of the first and second layers L1 and L2 when the composition ratio of the varying area A1 changes in the parabolic manner, linear manner, and stepped manner, respectively. A fourth point P44 denotes a potential barrier when the composition ratio of the varying area A1 changes abruptly near the interface B1.

Referring to FIG. 5, the potential barrier is the highest when the composition ratio of the varying area A1 of the first DBR layer 44*b* changes abruptly near the interface B1, and the potential barriers when the composition ratio of the varying area A1 changes in the parabolic manner, linear manner, and stepped manner are much lower than the potential barrier when the composition ratio of the varying area A1 changes abruptly near the interface B1. If the composition ratio of the varying area A1 changes in the parabolic manner, linear manner, and stepped manner, the potential barriers are low enough for a sufficient amount of current to flow. In particular, if the composition ratio of the varying area A1 changes in the parabolic manner, the potential barrier is the lowest.

When the composition ratio of the varying area A1 of the first DBR layer 44*b* changes in the parabolic manner, linear manner, or stepped manner, the potential barriers between the first and second layers L1 and L2 are low enough for a sufficient amount of current to flow. In particular, since the potential barrier between the first and second layers L1 and L2 is the lowest when the composition ratio of the varying area A1 changes in the parabolic manner, current that is generated and modulated by the optical-electric device 50 may pass through the first DBR layer 44*b* without large resistance and then may flow into the electric-optical device 44*a*.

Although light reflectivity increases as the number of layers included in the first DBR layer 44*b* increases, electrical resistance may also increase. Hence, by considering an increase in light reflectivity and electrical resistance, the number, thicknesses, and refractive indexes of layers included in the first DBR layer 44*b* may be determined reasonably.

Figure 6:
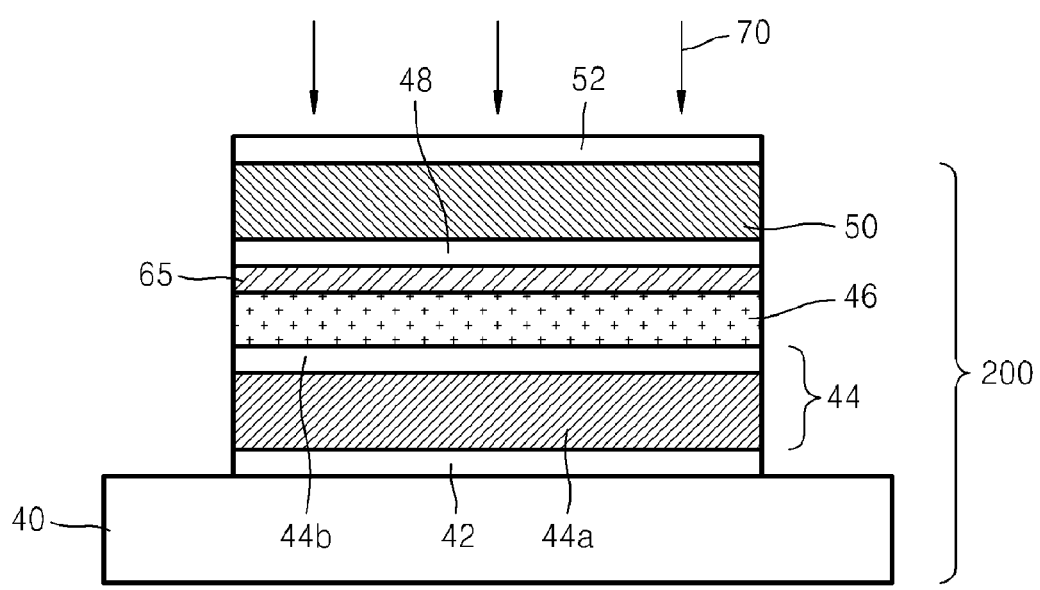
FIG. 6 is a cross-sectional view of an optical image modulator according to another exemplary embodiment of the present invention.

FIG. 6 is a cross-sectional view of an optical image modulator 200 according to another exemplary embodiment of the present invention.

The same members of the optical image modulator 200 of FIG. 6 as those of the optical image modulator 100 of FIG. 1 are denoted by the same reference numerals and a detailed explanation thereof will not be given. The relay lens set 54 and the optical image sensor 56 are not illustrated in FIG. 6 for convenience.

Referring to FIG. 6, the optical image modulator 200 includes a second DBR layer 65 between the interface layer 46 and the internal semiconductor electrode layer 48. Other configurations may be the same as those of the optical image modulator 100 of FIG. 1. The second DBR layer 65 may be a second light reflector. The first and second DBR layers 44b and 65 may be examples of the preventing member. Among light 70 incident on the optical image modulator 200, the second DBR layer 65 reflects light, which passes through the optical-electric device 50 without optical-electric conversion and is absorbed by the electric-optical unit 44 or passes through the optical-electric device 50 without optical-electric conversion and the electric-optical unit 44 and is incident on the optical image sensor 56, to the optical-electric device 50. The reflection band of the second DBR layer 65 may include the wavelength of an optical image. For example, the reflection band of the second DBR layer 65 may include a wavelength of about 850 nm. Due to the second DBR layer 65, among the light 70 incident on the optical image modulator 200, the loss of light not experiencing optical-electric conversion may be reduced.

FIG. 7 is a cross-sectional view of the second DBR layer 65 of the optical image modulator 200 of FIG. 6. In FIG. 7, the second DBR layer 65 has a reflectivity of 0.9 or more for a reflection band, i.e., a stop band. The central wavelength of the stop band is 850 nm. The composition of the second DBR layer 65 may be similar to the composition of the first DBR layer 44b, but the characteristics of layers of the second DBR layer 65 may be different from those of the first DBR layer 44b.

Referring to FIG. 7, the second DBR layer 65 may include a plurality of layers P11 through Pnn which are stacked sequentially. The number of layers of the second DBR layer 65 may be determined by considering an increase in reflectivity and resistance. Each of the plurality of layers P11 through Pnn includes one pair including a first layer L11 and a second layer L22 which are stacked sequentially. Accordingly, the second DBR layer 65 includes the first layers L11 and the second layers L22 which are stacked alternately.

For example, the first layer L11 may be an $Al_{0.9}Ga_{0.1}As$ layer. The composition of the second layer L22 may be the same as that of the first layer L11, but the composition ratio and the thickness of the second layer L22 may be different from those of the first layer L11 so that the second layer L22 and the first layer L11 have different refractive indexes. For example, the second layer L22 may be an $Al_{0.3}Ga_{0.7}As$ layer. If the first layer L11 is an $Al_{0.9}Ga_{0.1}As$ layer, the refractive index of the first layer L11 may be 3.06664 and the thickness t11 of the first layer L11 may be about 693 Å. If the second layer L22 is an $Al_{0.3}Ga_{0.7}As$ layer, the refractive index of the second layer L22 may be 3.4182 and the thickness t22 of the second layer L22 may be about 622 Å.

The second DBR layer 65 reflects incident light 80 having a central wavelength of 850 nm to the optical-electric device 50, and transmits current, which is generated and modulated by the optical-electric device 50, to the electric-optical unit 44 while reducing the loss of the current. To this end, a varying area A2 of the second DBR layer 65 including first and second areas A11 and B11 near an interface B1 of the first and second layers L11 and L22 of the second DBR layer 65 may have the same composition ratio variation as that of the varying area A1 of the first DBR layer 44b.

Accordingly, the description with reference to FIGS. 3, 4, and 5 may apply to the second DBR layer 65. The first and second layers L1 and L2 of the first DBR layer 44b may be transparent layers or semi-transparent layers. The first and second layers L11 and L22 of the second DBR layer 65 may also be transparent layers or semi-transparent layers. Also, each of the first and second DBR layers 44b and 65 may be a stack of material layers obtained by combining a p-type, n-type, an or intrinsic III-V compound semiconductor, Si, and Ge. The compound semiconductor may include Al, Ga, In, As, Sb, P, or N. The varying area A1 of the first DBR layer 44b and the varying area A2 of the second DBR layer 65 may be formed using digital alloy grading of a molecular beam epitaxy (MBE) system.

Figure 8:
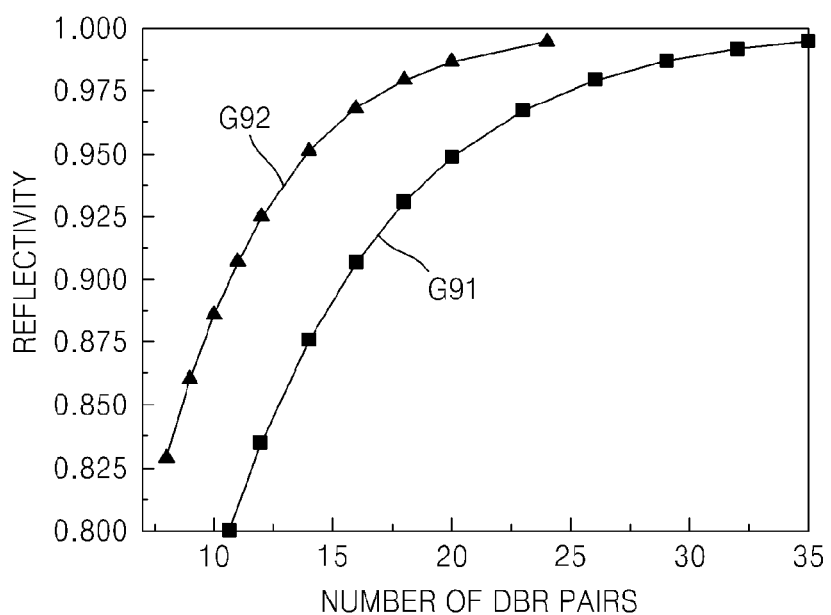
FIG. 8 is a graph showing the reflectivity of each of the first and second DBR layers according to the number of pairs of each of the first and second DBR layers.

FIG. 8 is a graph showing the reflectivity of each of the first and second DBR layers 44b and 65 to a central wavelength of each DBR layer according to the number of pairs of each of the first and second DBR layers 44b and 65. In FIG. 8, a first graph G91 shows the reflectivity of the first DBR layer 44b to incident light having a central wavelength of 650 nm. The incident light having the central wavelength of 650 nm may be light backward emitted from the electric-optical device 44a. A second graph G92 shows the reflectivity of the second DBR layer 65 to incident light having a central wavelength of 850 nm. The incident light having the central wavelength of 850 nm may be transmitted through the optical-electric device 50 without optical-electric conversion. Referring to FIG. 8, the reflectivity of each of the first and second DBR layers 44b and 65 is greater than 0.9 if the number of pairs is greater than 17.

Figure 9:
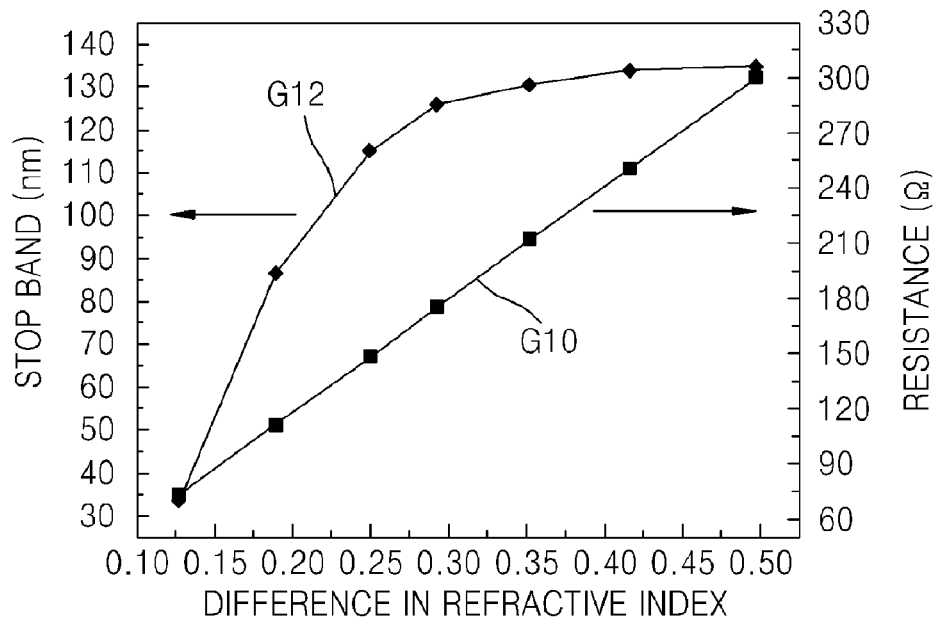
FIG. 9 is a graph showing the stop band, i.e., the reflection band, and the resistance of the first and second DBR layers according to a difference in refractive index between the first and second layers of the first and second DBR layers.

FIG. 9 is a graph showing the stop band, i.e., the reflection band, and the resistance of the second DBR layer 65 according to a difference in refractive index between the first and second layers L11 and L22 of the second DBR layer 65.

In FIG. 9, the horizontal axis represents a difference between the refractive index of the first layer L11 and the refractive index of the second layer L22. The composition ratio of the varying area A2 about the interface B1 changes in a parabolic manner. In FIG. 9, a first graph G10 shows a change in resistance, and a second graph G12 shows a change in stop band.

Referring to FIG. 9, when a difference in refractive index between the first and second layers L11 and L22 is 0.3, a stop band is about 125 nm and the resistance of the second DBR layer 65 is 175Ω. The resistance is low enough to transmit current, which is generated by the optical-electric device 50, to the electric-optical unit 44 without loss.

It may be seen from FIGS. 8 and 9 that the first and second DBR layers 44b and 65 of FIGS. 1 and 6 have high reflectivity and low resistance.

Figure 10:
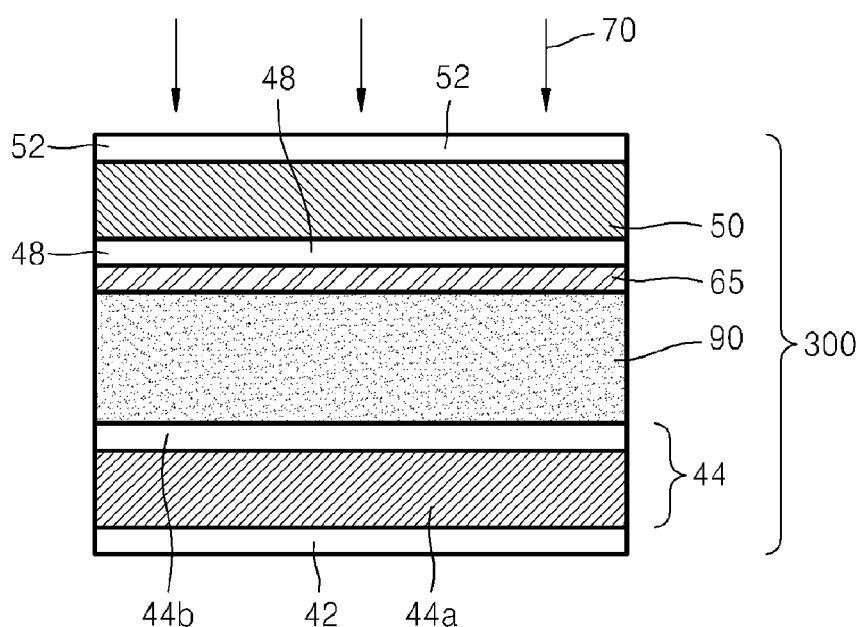
FIG. 10 is a cross-sectional view of an optical image modulator according to another exemplary embodiment of the present invention.

FIG. 10 is a cross-sectional view of an optical image modulator 300 according to another exemplary embodiment of the present invention. The same members of the optical image modulator 300 of FIG. 10 as those of the second modulator 200 of FIG. 6 are denoted by the same reference numerals, and a detailed explanation thereof will not be given. Like in the optical image modulator 200, the optical image sensor 56 and the relay lens set 54 concentrating light output from the optical image modulator 300 are not illustrated in FIG. 10 for convenience.

Referring to FIG. 10, the optical image modulator 300 includes the first transparent electrode layer 42, the electric-optical unit 44 including the first DBR layer 44b, a doped semiconductor substrate 90, the second DBR layer 65, the internal semiconductor electrode layer 48, the optical-electric device 50, and the second transparent electrode layer 52 which may be stacked sequentially.

The doped semiconductor substrate 90 is an electron transporting layer that transmits current, which is generated by the optical-electric device 50 and then modulated by a modulating signal applied by an external electronic device, to the electric-optical unit 44. The current generated by the optical-electric device 50 may be modulated to current with a desired waveform, such as a sine waveform, a ramp waveform, or a square waveform. The external electronic device may be included in the optical-electric device 50, or may constitute an optical-electric unit or module together with the optical-electric device 50. The doped semiconductor substrate 90 may be a glass substrate, or a compound semiconductor substrate such as a GaAs substrate. More broadly, the doped semiconductor substrate 90 may be a substrate including materials obtained by combining a p-type, n-type, or intrinsic III-V compound semiconductor, Si, and Ge. The compound semiconductor may include Al, Ga, In, As, Sb, P or N. The thickness of the doped semiconductor substrate 900 may be greater than those of other members.

Accordingly, in order to prevent light backward emitted from the electric-optical unit 44 from proceeding to the optical-electric device 50 and an adjacent pixel, the first DBR layer 44b may be disposed as close to the electric-optical device 44a as possible. Each of FIGS. 1, 6, and 10 is an enlarged view of portions corresponding to one pixel of the optical image modulators. Accordingly, barrier ribs may be present between the portions corresponding to pixels of each of the optical image modulators 100, 200, and 300 of FIGS. 1, 6, and 10.

Each of the optical image modulators 100, 200, and 300 may include one integral DBR layer performing the functions of both of the first and second DBR layers 44b and 65. For example, the integral DBR layer may be disposed between the electric-optical device 44a and the optical-electric device 50 in FIG. 1. The integral DBR layer may be disposed instead of the first DBR layer 44b. Alternatively, if the integral DBR layer may perform the function of the interface layer 46, the integral DBR layer may be disposed instead of the interface layer 46 in FIG. 1. In this case, the first DBR layer 44b may be omitted. The integral DBR layer may be composed of two portions. For example, a first portion of the integral DBR layer facing the electric-optical device 44a may have the same composition as that of the first DBR layer 44b, and a second portion of the integral DBR layer facing the optical-electric device 50 may have the same composition as that of the second DBR layer 65. If the interface layer 46 is omitted, the optical image modulator 200 of FIG. 6 may be provided with the integral DBR layer including the first and second DBR layers 44b and 65.

The optical image modulators 100, 200, and 300 shown in FIGS. 1, 6, and 10 may be applied to an optical apparatus that may modulate optical information to desired optical information using optical-electric conversion and electric-optical conversion and record the desired optical information. For example, the optical image modulators 100, 200, and 300 may be applied to a three-dimensional (3D) camera, a laser radar (LADAR), an infrared (IR) imager, or a high-speed camera.

Figure 11:
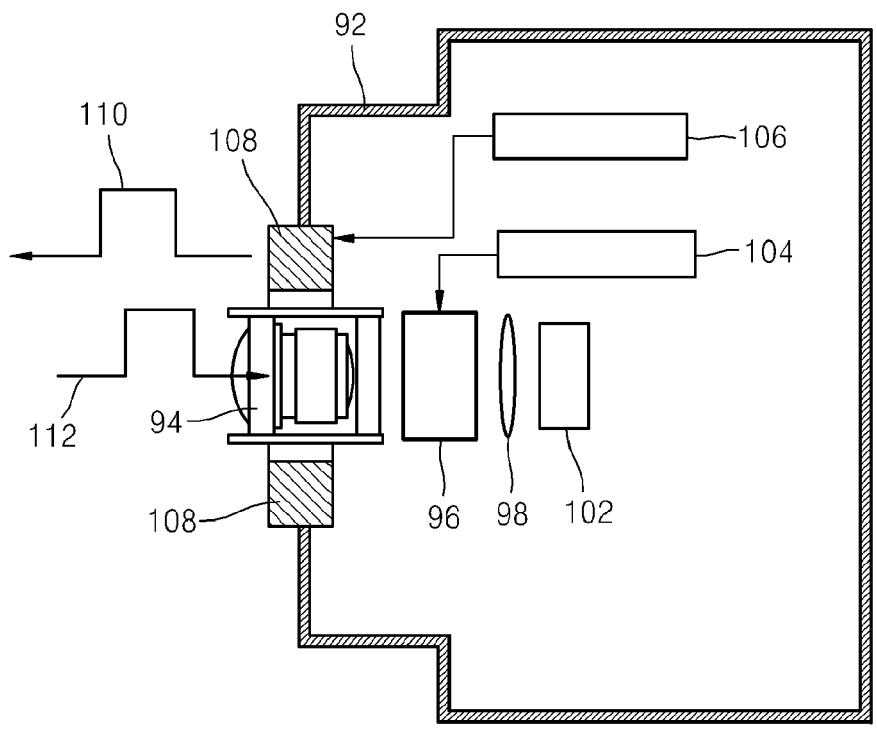
FIG. 11 illustrates a 3D camera including any one of the optical image modulators of FIGS. 1, 6, and 10.

FIG. 11 illustrates a 3D camera including any one of the optical image modulators 100, 200, and 300 of FIGS. 1, 6, and 10.

Referring to FIG. 11, an optical image modulator 96 or an optical image shutter is disposed between an objective lens 94 and a relay lens set 98. The optical image modulator 96 may be any one of the optical image modulators 100, 200, and 300 of FIGS. 1, 6, and 10. The operation of the 3D camera of FIG. 11 will now be explained briefly. IR light 110 is emitted by an IR emitting unit 108 to a subject (not shown). IR light 112 reflected by the subject is incident on the optical image modulator 96 through the objective lens 94, is modulated to visible light by the optical image modulator 96, and is focused on an optical image sensor 102 by the relay lens set 98.

Accordingly, information about the subject is recorded on the optical image sensor 102. The information recorded on the optical image sensor 102 may be processed by an external processing device such as a computer. The IR emitting unit 108 is controlled by an IR emission driver 106. The operation of the optical image modulator 96 is controlled by a controller 104. The IR emitting unit 108 may be an LED emitting IR light. In FIG. 11, the 3D camera also includes a housing or a case 92.

FIGS. 12 through 17 are cross-sectional views for explaining a method of manufacturing the optical image modulator 100 of FIG. 1, according to an exemplary embodiment of the present invention.

Each of the optical image modulators 100, 200, and 300 of FIGS. 1, 6, and 10 and the optical image modulator including the integral DBR layer may be formed as a monolithic modulator by stacking all members. Alternatively, each of the optical image modulators 100, 200, and 300 of FIGS. 1, 6, and 10 and the optical image modulator including the integral DBR layer may be formed by separately manufacturing the individual members and bonding the manufactured members.

It is assumed that the optical image modulator 100 of FIG. 1 is manufactured. Since the materials used to form the members of the optical image modulator 100 of FIG. 1 have already been explained, a detailed explanation thereof will not be given.

Figure 12:
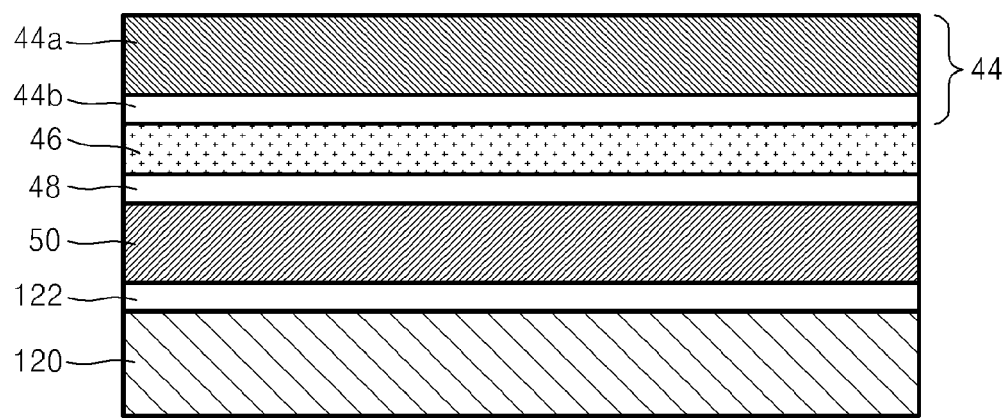
FIGS. 12 through 17 are cross-sectional views for explaining a method of manufacturing the optical image modulator of FIG. 1, according to an exemplary embodiment of the present invention.

Referring to FIG. 12, a sacrificial layer 122 is formed on a substrate 120. The substrate 120 may be a semiconductor substrate, for example, a III-V compound semiconductor substrate. For example, the sacrificial layer 122 may be a silicon oxide (SiO2) layer. The optical-electric device 50, the internal semiconductor layer 48, the interface layer 46, and the electric-optical unit 44 may be stacked sequentially on the sacrificial layer 122. The electric-optical unit 44 may be formed by sequentially stacking the first DBR layer 44b and the electric-optical device 44a on the interface layer 46. The sacrificial layer 122, the optical-electric device 50, the internal semiconductor layer 48, the interface layer 46, and the electric-optical unit 44 may be stacked using chemical vapor deposition (CVD) or MBE deposition. For example, the CVD may be metal organic CVD (MOCVD).

The first DBR layer 44b may be an example of a light reflecting unit. Accordingly, another light reflecting unit having the same function as that of the first DBR layer 44b and having a different structure or composition from that of the first DBR layer 44b may be disposed instead of the first DBR layer 44b. The first DBR layer 44b may be one of elements constituting the electric-optical device 44a. In this case, the electric-optical unit 44 may be a monolithic light emitting device including the first DBR layer 44b and the electric-optical device 44a, for example, a light emitting diode or a semiconductor laser diode including a DBR layer. The first DBR layer 44b and the electric-optical device 44a may be separate members. In this case, the electric-optical device 44a may be a light emitting diode or a semiconductor laser diode not including a DBR layer. Hence, in the latter case, the electric-optical unit 44 includes two devices.

Figure 13:
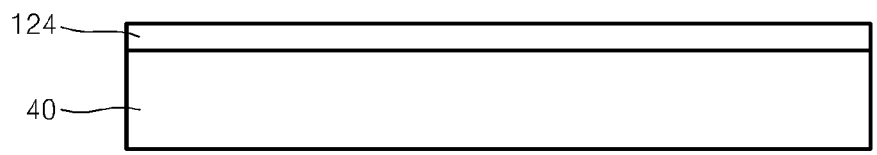

Referring to FIG. 13, the transparent substrate 40 is prepared, and a lower transparent electrode layer 124 is formed on the transparent substrate 40. The transparent substrate 40, which is formed of a transparent material suitable for an optical image modulator or an optical image sensor, may be a glass substrate or a sapphire substrate. The lower transparent electrode layer 124 may be an ITO layer, or another transparent electrode layer. The lower transparent electrode layer 124 may correspond to the first transparent electrode layer 42 of FIG. 1.

Figure 14:
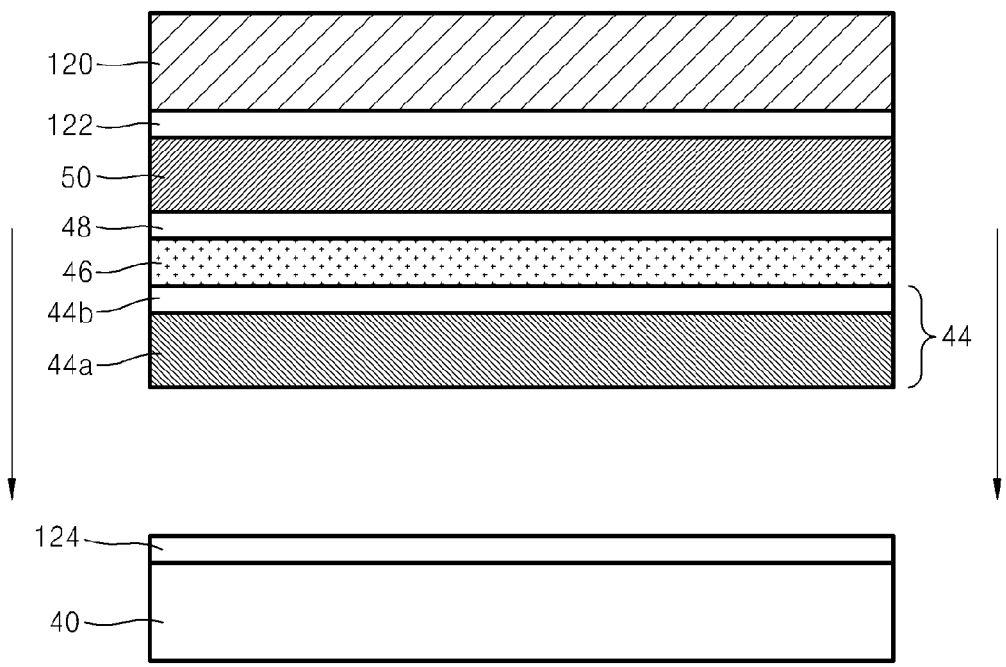
Figure 15:

Referring to FIG. 14, the substrate 120 of FIG. 12 is aligned over the transparent substrate 40 on which the lower transparent electrode layer 124 is formed. The substrate 120 is aligned with the transparent substrate 40 so that the electric-optical unit 44 faces the lower transparent electrode layer 124. In the state where the transparent substrate 40 and the substrate 120 are aligned with each other, the substrate 120 is lowered and the electric-optical device 44a of the electric-optical unit 44 and the lower transparent electrode layer 124 are bonded to each other. Next, the sacrificial layer 122 is lifted off and thus the substrate 120 is removed. As a result, an optical modulation structure as shown in FIG. 15 is formed.

Figure 16:
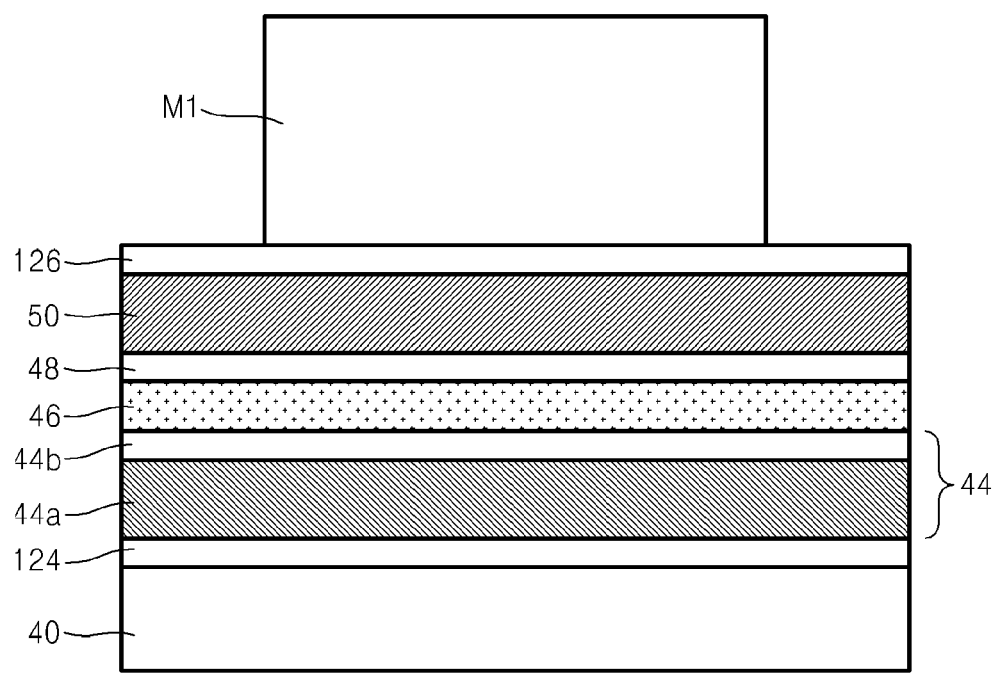
Figure 17:
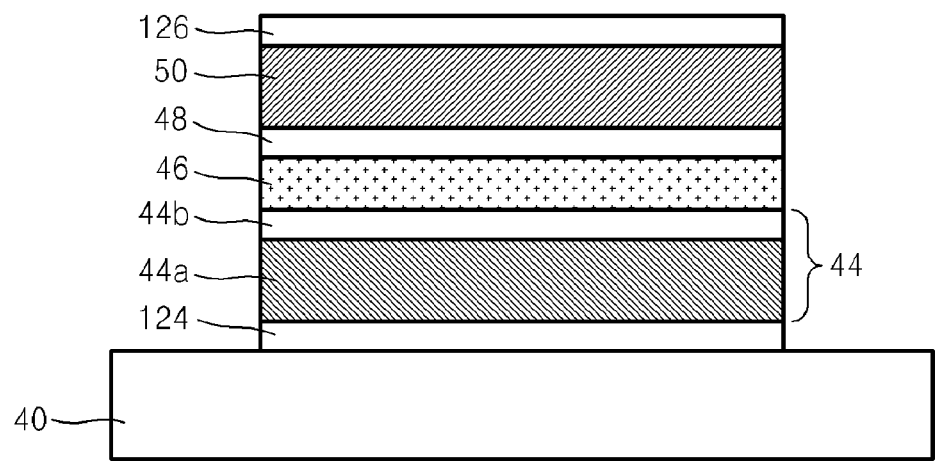

Referring to FIG. 16, an upper transparent electrode layer 126 is formed on the optical-electric device 50. The upper transparent electrode layer 126 may correspond to the second transparent electrode layer 52 of FIG. 1. The upper transparent electrode layer 126 may be formed of the same material as that of the lower transparent electrode layer 124. A mask M1 defining an optical image modulator region is formed on the upper transparent electrode layer 126. The mask M1 may be a photosensitive layer pattern. The upper transparent electrode layer 126, the optical-electric device 50, the internal semiconductor layer 48, the interface layer 46, the electric-optical unit 44, and the lower transparent electrode layer 124 around the mask M1 are sequentially etched. Next, the mask M1 is removed. As a result, such an optical image modulator as shown in FIG. 17 is formed.

The method of FIGS. 12 through 17 may be easily used to manufacture the optical image modulators 200 and 300 of FIGS. 6 and 10 and the optical image modulator including the integral DBR layer.

When the first DBR layer 44b is formed, the varying area A1 (see FIG. 2) of the first DBR layer 44b where the composition ratio changes may be formed using digital alloy grading of an MBE system.

The optical image modulators 200 and 300 of FIGS. 6 and 10 and the optical image modulator including the integral DBR layer may be easily formed using the method of FIGS. 12 through 17. When the first and second DBR layers 44b and 65 and the integral DBR layer are formed, the varying areas A1 (see FIG. 2) and A2 (see FIG. 7) of the first and second DBR layers 44b and 65 and a varying area, in which composition ratio is varied, of the integral DBR layer may be formed using digital alloy grading of the MBE system. The varying area of the integral DBR layer formed in the first and second portions may be easily known from the varying area A1 of the first DBR layer 44b and the varying area A2 of the second DBR layer 65.

Figure 18:
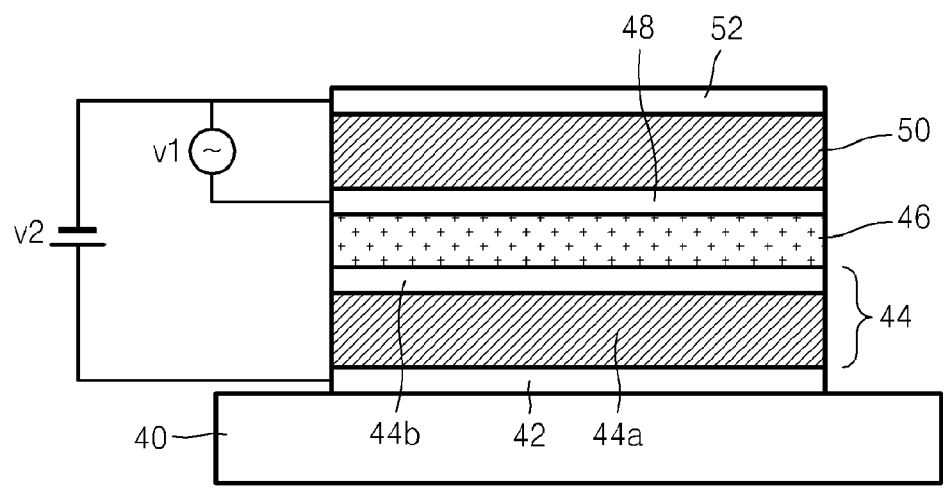
FIG. 18 is a cross-sectional view for explaining a method of operating the optical image modulator of FIG. 1, according to an exemplary embodiment of the present invention.

FIG. 18 is a cross-sectional view for explaining a method of operating the optical image modulator 100 of FIG. 1, according to an exemplary embodiment of the present invention.

Referring to FIG. 18, a first voltage v1 is applied to both ends of the optical-electric device 50. The first voltage v1 may be a modulating signal voltage. The number of electrons generated by the optical-electric device 50 may be controlled by the first voltage v1. Current modulated by the optical-electric device 50 is generated due to the first voltage v1. A second voltage v2 is applied between the first transparent electrode layer 42 and the second transparent electrode layer 52. The second voltage v2 is a bias voltage applied between the first and second transparent electrode layers 42 and 52. The current generated and modulated by the optical-electric device 50 is attracted by an electric field, which is formed due to the second voltage v2, and thus is inputted into the electric-optical unit 44.

Accordingly, an electron image, that is, an image pictured by electrons, output from the optical-electron device 50 is output as visible light by the electric-optical unit 44. An optical image output from the electric-optical unit 44 passes through a relay lens set that having an adjusted magnification, and is recorded on an optical image sensor such as a CCD or a CMOS. The first and second voltages v1 and v2 may be applied to the optical image modulators 200 and 300 of FIGS. 6 and 10 and the optical image modulator including the integral DBR layer in the same way as that for the optical image modulator 100. Accordingly, the method of FIG. 18 may be used to operate the optical image modulators 200 and 300 of FIGS. 6 and 10 and the optical image modulator including the integral DBR layer.

As described above, according to the one or more of the above exemplary embodiments of the present invention, since a highly conductive optical reflective layer is disposed between an optical-electric device and an electric-optical device, optical interference between the optical-electric device and the electric-optical device caused by backwardly emitted light may be prevented, and the backwardly emitted light may be prevented from being scattered to an adjacent pixel. Accordingly, noise may be prevented, and thus the quality and reliability of an output image may be improved.

Furthermore, since the highly conductive optical reflective layer reflects light, which passes through the optical-electric device without optical-electric conversion among light incident on an optical image modulator, to the optical-electric device to use the light in outputting a normal optical image, the amount of light reaching an optical image sensor may be increased.

Moreover, since a potential barrier between layers included in the highly conductive optical reflective layer is reduced, an increase in resistance due to the existence of the highly conductive optical reflective layer may be prevented.

In addition, if the optical image modulator according to the one or more embodiments is used in an optical apparatus, such as a 3D camera, a LADAR, an IR imager, or a high-speed camera, a high quality image having a high signal-to-noise ratio may be obtained and sensitivity to the incident light may be enhanced.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An optical image modulator comprising:
   an optical-electric unit;
   an electric-optical unit;
   a first light amount increasing unit which increases an amount of forward light emission of the electric-optical unit; and
   a second light amount increasing unit disposed between the optical-electric unit and the first light amount increasing unit, the second light amount increasing unit further increasing the amount of forward light emission of the electric-optical unit,
   wherein current that is generated and modulated by the optical-electric unit pass through the first and second light amount increasing unit and flow into the electric-optical unit.

2. The optical image modulator of claim 1, wherein the first light amount increasing unit comprises a first light reflector which reflects light, which travels from an inside of the electric-optical unit toward the optical electric unit, to the electric-optical unit.

3. The optical image modulator of claim 1, wherein the first light amount increasing unit is included in the electric-optical unit.

4. The optical image modulator of claim 1, wherein the first light amount increasing unit is disposed between the optical-electric unit and the electric-optical unit.

5. The optical image modulator of claim 2, wherein the first light amount increasing unit is a distributed Bragg reflector (DBR) layer comprising a plurality of pairs, each of the plurality of pairs comprising a first layer with a first refractive index and a second layer with a second refractive index that is different from the first refractive index,
wherein a varying area, which is disposed near an interface between the first layer and the second layer, includes a portion of the first layer and a portion of the second layer, and comprises a varying composition ratio.

6. The optical image modulator of claim 3, wherein the optical-electric unit comprises the first light amount increasing unit as an element thereof.

7. The optical image modulator of claim 4, wherein the electric-optical unit comprises a light emitting device.

8. The optical image modulator of claim 3, wherein the first light amount increasing unit is a light reflector which reflects light, which travels from an inside of the electric-optical unit toward the optical-electric unit, to the electric-optical unit.

9. The optical image modulator of claim 1, wherein the optical-electric unit is an optical-electric device, or comprises the optical-electric device and a modulation device which modulates current generated by the optical-electric device.

10. The optical image modulator of claim 1, further comprising an electron transporting layer disposed between the first light amount increasing unit and the second light amount increasing unit, the electron transporting layer transporting electrons generated by the optical-electric unit to the electric-optical unit,
wherein the first light amount increasing unit is disposed under the electron transporting layer and the second light amount increasing unit is disposed over the electron transporting layer.

11. The optical image modulator of claim 1, wherein the second light amount increasing unit is a second light reflector that reflects light, which passes through the optical-electric unit without optical-electric conversion, to the optical-electric unit.

12. The optical image modulator of claim 11, wherein the second light reflector is a distributed Bragg reflector (DBR) layer comprising a plurality of pairs, each of the plurality of pairs comprising a first layer with a first refractive index and a second layer with a second refractive index that is different from the first refractive index,
wherein a varying area, which is disposed near an interface between the first layer and the second layer, includes a portion of the first layer and a portion of the second layer, and has a continuously varying composition ratio.

13. The optical image modulator of claim 5, wherein the composition ratio of the varying area changes in one of a parabolic manner, a stepped manner, and a linear manner.

14. The optical image modulator of claim 9, wherein the optical-electric device is one of a photodiode (PD), a heterojunction phototransistor (HPT), an avalanche photodiode (APD), and a quantum wall infrared photodetector (QWIP).

15. The optical image modulator of claim 1, wherein the first light amount increasing unit and the second light amount increasing unit contact each other to form a monolithic body.

16. An optical apparatus comprising the optical image modulator of claim 1.

17. The optical apparatus of claim 16, wherein the optical apparatus is a three-dimensional (3D) camera, a laser radar (LADAR), an infrared (IR) imager, or a high-speed camera.

18. A method of operating the optical image modulator according to claim 1, the method comprising:
operating the optical-electric unit to generate current; and
inputting the current generated by operating the optical-electric unit to the electric-optical unit through the first light amount increasing unit.

19. The method of claim 18, wherein the second light amount increasing unit reflects light, which passes through the optical-electric unit without optical-electric conversion, to the optical-electric unit and the current sequentially passes through the second light amount increasing unit and the first light amount increasing unit and is inputted to the electric-optical unit.

20. The method of claim 18, wherein the first light amount increasing unit is a first distributed Bragg reflector (DBR) layer comprising a varying area having a continuously varying composition ratio.

21. The method of claim 18, wherein the second light amount increasing unit is a second distributed Bragg reflector (DBR) layer comprising a varying area having a continuously varying composition ratio.

22. The optical image modulator of claim 1, wherein the first light amount increasing unit and the second light amount increasing unit are disposed between the optical-electric unit and the electric-optical unit.

23. A method of manufacturing an optical image modulator including an optical-electric device and an electric-optical device which are sequentially disposed, the method comprising:
forming a first light amount increasing unit between the electric-optical device and the optical-electric device,
forming a second light amount increasing unit between the first light amount increasing unit and the optical-electric device,
wherein the first light amount increasing unit increases an amount of forward light emission of the electric-optical device, and
wherein current that is generated and modulated by the optical-electric unit pass through the first and second light amount increasing unit and flow into the electric-optical unit.

24. The method of claim 23, wherein the first light amount increasing unit and the electric-optical device form a monolithic electric-optical unit.

25. The method of claim 23, wherein after the electric-optical device is formed, the first light amount increasing unit is formed on the electric-optical device.

26. The method of claim 24, wherein the electric-optical device is a light emitting device.

27. The method of claim 23, wherein the second light amount increasing unit reflects light, which passes through the optical-electric device without optical-electric conversion, to the optical-electric device.

28. The method of claim 23, wherein the first light amount increasing unit is a first distributed Bragg reflector (DBR) layer comprising a varying area having a composition ratio that changes continuously.

29. The method of claim 23, wherein the second light amount increasing unit is a second distributed Bragg reflector (DBR) layer comprising a varying area having a composition ratio that changes continuously.

30. The method of claim 23, wherein the first light amount increasing unit and the second light amount increasing unit are disposed between the optical-electric unit and the electric-optical unit.

* * * * *